United States Patent
Barton et al.

(10) Patent No.: US 10,927,809 B2
(45) Date of Patent: Feb. 23, 2021

(54) METHOD OF ATTACHING A TIP EXTENSION TO A WIND TURBINE BLADE

(71) Applicant: Vestas Wind Systems A/S, Aarhus N. (DK)

(72) Inventors: Leon Barton, Isle Of Wight (GB); Alan Bower, Isle Of Wight (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/332,019

(22) PCT Filed: Sep. 14, 2017

(86) PCT No.: PCT/DK2017/050291
§ 371 (c)(1),
(2) Date: Mar. 11, 2019

(87) PCT Pub. No.: WO2018/050192
PCT Pub. Date: Mar. 22, 2018

(65) Prior Publication Data
US 2019/0360457 A1 Nov. 28, 2019

(30) Foreign Application Priority Data

Sep. 15, 2016 (DK) .......................... PA 2016 70713

(51) Int. Cl.
*F03D 1/06* (2006.01)
*F03D 13/10* (2016.01)

(52) U.S. Cl.
CPC .......... *F03D 1/0675* (2013.01); *F03D 13/10* (2016.05); *F05B 2230/23* (2013.01); *F05B 2230/80* (2013.01); *F05B 2240/374* (2020.08)

(58) Field of Classification Search
CPC .... F03D 1/0633; F03D 1/0641; F03D 1/0675; F03D 1/0683; F03D 13/10;
(Continued)

(56) References Cited

U.S. PATENT DOCUMENTS 5,240,543 A * 8/1993 Fetterhoff ............... F16B 5/01
156/293
7,988,421 B2 * 8/2011 Bakhuis ............... F03D 1/0633
416/224
(Continued)

FOREIGN PATENT DOCUMENTS

CN 102192108 A 9/2011
CN 104032641 A 9/2014
(Continued)

OTHER PUBLICATIONS

Danish Patent and Trademark Office, Search and Examination Report in PA 2016 70713, dated Mar. 14, 2017.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

A method of attaching a tip extension to a wind turbine blade is described. The method comprises: fitting the tip extension over a tip end of the blade such that an overlap region is defined between an outer surface of the blade and an inner surface of the tip extension; and supplying adhesive to the overlap region via one or more holes provided in the tip extension to bond the tip extension to the blade. In preferred embodiments, adhesive dams are provided in the overlap region to define bond cavities and constrain the adhesive within the bond cavities. An assembly comprising a wind turbine blade and a tip extension bonded thereto is also described.

17 Claims, 10 Drawing Sheets

(58) Field of Classification Search
CPC .............. F05B 2230/31; F05B 2230/50; F05B 2240/30; F05B 2240/301; F05B 2240/302; F05B 2280/6003; F05B 2230/23; F05B 2240/374; F05B 2230/80
See application file for complete search history.

(56) References Cited

U.S. PATENT DOCUMENTS

| | | | |
|---|---|---|---|
| 9,945,354 B2* | 4/2018 | Shair | F03D 1/0675 |
| 2011/0223028 A1* | 9/2011 | Stege | F03D 1/065 |
| | | | 416/223 R |
| 2012/0024457 A1* | 2/2012 | Ramm | F03D 1/0675 |
| | | | 156/64 |
| 2012/0121430 A1 | 5/2012 | Olsen et al. | |
| 2012/0308396 A1* | 12/2012 | Hibbard | F03D 1/0675 |
| | | | 416/241 R |
| 2014/0186175 A1 | 7/2014 | Baehmann et al. | |
| 2014/0186189 A1* | 7/2014 | Stege | F03D 1/0675 |
| | | | 416/229 R |
| 2014/0286780 A1 | 9/2014 | Lemos et al. | |
| 2016/0177915 A1 | 6/2016 | Gonzalez et al. | |
| 2017/0145986 A1* | 5/2017 | Baehmann | F03D 1/0675 |
| 2017/0363062 A1* | 12/2017 | Merzhaeuser | F03D 13/20 |

FOREIGN PATENT DOCUMENTS

| | | |
|---|---|---|
| CN | 104512793 A | 4/2015 |
| CN | 204663759 U | 9/2015 |
| CN | 105500696 A | 4/2016 |
| CN | 205467349 U | 8/2016 |
| DK | 2182203 T3 | 11/2013 |
| EP | 2182203 A2 | 5/2010 |
| EP | 2365212 A1 | 9/2011 |
| EP | 2444657 A1 | 4/2012 |
| EP | 2653717 A1 | 10/2013 |
| EP | 2735731 A1 | 5/2014 |
| WO | 2016066852 A1 | 5/2016 |
| WO | 2018050193 A1 | 3/2018 |

OTHER PUBLICATIONS

European Patent Office, International Search Report and Written Opinion in PCT Application Serial No. PCT/KD2017/050291, dated Nov. 21, 2017.
China National Intellectual Property Administration, First Notification of Office Action in CN Application No. 201780068398.4, dated Apr. 8, 2020.
European Patent Office, Examination Report in EP Application No. 17768974.2, dated Mar. 25, 2020.
Danish Patent and Trademark Office, Search and Examination Report in PA 2016 70714, dated Mar. 14, 2017.
European Patent Office, International Search Report and Written Opinion in PCT Application U.S. Appl. No. PCT/KD2017/050292, dated Nov. 21, 2017.

* cited by examiner

METHOD OF ATTACHING A TIP EXTENSION TO A WIND TURBINE BLADE

TECHNICAL FIELD

The present invention relates generally to tip extensions for wind turbine blades, and more specifically to a method of attaching a tip extension to a wind turbine blade.

BACKGROUND

There is a continuing desire to generate increased levels of power from existing wind power production facilities such as on-shore and off-shore wind farms. One way to achieve this is to add further wind turbines to a wind farm or to replace existing wind turbines with larger wind turbines capable of generating more power. Another way to achieve this is to increase the power production and energy capture from existing turbines, for example by replacing the blades with larger blades. However, as the blades of wind turbines are expensive components, it is often prohibitive in terms of cost to replace the blades.

It has therefore been proposed to modify the blades of existing wind turbines by adding devices to the blades. For example, it is known to add devices to the blades to increase the dimensions of the blades. One example of this is a blade tip extension, which may be provided in the form of a sock that fits over the tip of a blade and increases the length of the blade. The provision of tip extensions increases the overall length of the blades and thus increases the swept area of the rotor, allowing the wind turbine to capture more energy from the wind.

The installation of blade tip extensions is technically challenging. The tip extensions must be fitted accurately to the blade and attached firmly. As the devices are typically installed to wind turbine blades in the field, the process is carried out by operators working at a significant height with exposure to often harsh climate conditions. It is therefore important to develop attachment processes that are both straightforward and reliable. To this end, the tip extensions should be designed to facilitate the attachment process.

Against this background, it is an object of the present invention to provide an effective and reliable method of attaching a tip extension to a wind turbine blade.

SUMMARY OF THE INVENTION

According to a first aspect of the present invention there is provided a method of attaching a tip extension to a wind turbine blade. The method comprises: providing a wind turbine blade having an outer surface and a tip end; providing a tip extension having an outer shell defining a substantially hollow interior for receiving the tip end of the blade; fitting the tip extension over the tip end of the blade such that an inboard portion of the tip extension overlaps the tip end of the blade and an overlap region is defined between the outer surface of the blade and an inner surface of the inboard portion of the tip extension; and supplying adhesive to the overlap region via one or more holes provided in the outer shell of the tip extension to bond the tip extension to the blade.

The holes in the tip extension conveniently allow adhesive to be supplied between the blade and the tip extension once the tip extension has been fitted to the blade in the required position. The holes are preferable already provided in the tip extension before the tip extension is fitted, but they could alternatively be formed after the tip extension is fitted to the blade.

Preferably the adhesive is injected through the one or more holes.

The method may advantageously comprise providing one or more adhesive dams in the overlap region. The adhesive dams may be arranged to at least partially define one or more bond cavities in the overlap region. The method may comprise supplying the adhesive to the one or more bond cavities via the one or more holes in the outer shell of the tip extension. The adhesive dams advantageously serve to constrain adhesive to within the bond cavities, and may also be referred to as adhesive-constraining dams.

The adhesive dams are preferably made from foam, but may be made from other suitable materials. The method may comprise attaching the adhesive dam(s) to the tip end of the blade before fitting the tip extension to the blade. Alternatively or additionally the adhesive dams may be attached to the inner surface of the tip extension. The adhesive dam(s) preferably become sandwiched between the outer surface of the blade and the inner surface of the tip extension when the tip extension is fitted to the blade. The adhesive dams may therefore advantageously form a seal between the blade and the tip extension. Preferably the adhesive dam(s) are permeable to air.

A plurality of holes may be defined in the outer shell of the tip extension. The method preferably comprises supplying the adhesive through each hole sequentially. The plurality of holes may be mutually spaced in a row that extends in a spanwise direction of the tip extension. The method may advantageously comprise sequentially supplying adhesive through each hole in the row moving in a direction towards an open end of the tip extension. The open end of the tip extension is preferably an inboard end. Advantageously, air in the overlap region may escape via the open end of the tip extension when the adhesive is supplied to the overlap region. Air may also escape through the adhesive dams if they are air permeable. This avoids voids forming in the adhesive bonds.

The outer shell of the tip extension may be translucent, for example it may be formed from translucent materials such as glass-fibre reinforced plastic (GFRP). This advantageously and conveniently allows the progression of adhesive in the bond cavities to be visually monitored through the shell. The method may comprise terminating injection through a first hole when the flow of adhesive is seen through the translucent outer shell of the tip extension to approach an adjacent hole.

The method may further comprise providing one or more spacers in the overlap region. The spacers may be arranged to ensure a minimum clearance between the blade and the tip extension for the adhesive. The spacers are preferably pre-attached to the inner surface of the tip extension.

The method may comprise removing a tip of the wind turbine blade prior to fitting the tip extension. The method may comprise removing paint and/or gel coat from the outer surface of the blade prior to fitting the tip extension.

A method of attaching a tip extension to a wind turbine blade has been outlined above. The method essentially comprises: fitting the tip extension over a tip end of the blade such that an overlap region is defined between an outer surface of the blade and an inner surface of the tip extension; and supplying adhesive to the overlap region via one or more holes provided in the tip extension to bond the tip extension to the blade. One or more adhesive dams may advantageously be provided in the overlap region to define bond cavities and constrain the adhesive within the bond cavities.

According to a second aspect of the present invention there is provided a wind turbine blade assembly comprising a wind turbine blade and a tip extension attached to a tip end of the blade according to the method described above.

According to a third aspect of the present invention there is provided a wind turbine blade assembly comprising: a wind turbine blade having a tip end; a tip extension fitted to the tip end of the blade; an overlap region defined between an inboard portion of the tip extension and the tip end of the blade; and one or more adhesive dams in the overlap region at least partially defining one or more bond cavities; wherein the tip extension is bonded to the blade by adhesive in the bond cavities.

Optional and advantageous features described in relation to one aspect of the invention apply equally to all aspects of the invention. Repetition of optional features and associated advantages is avoided for reasons of conciseness.

DETAILED DESCRIPTION

Figure 1:
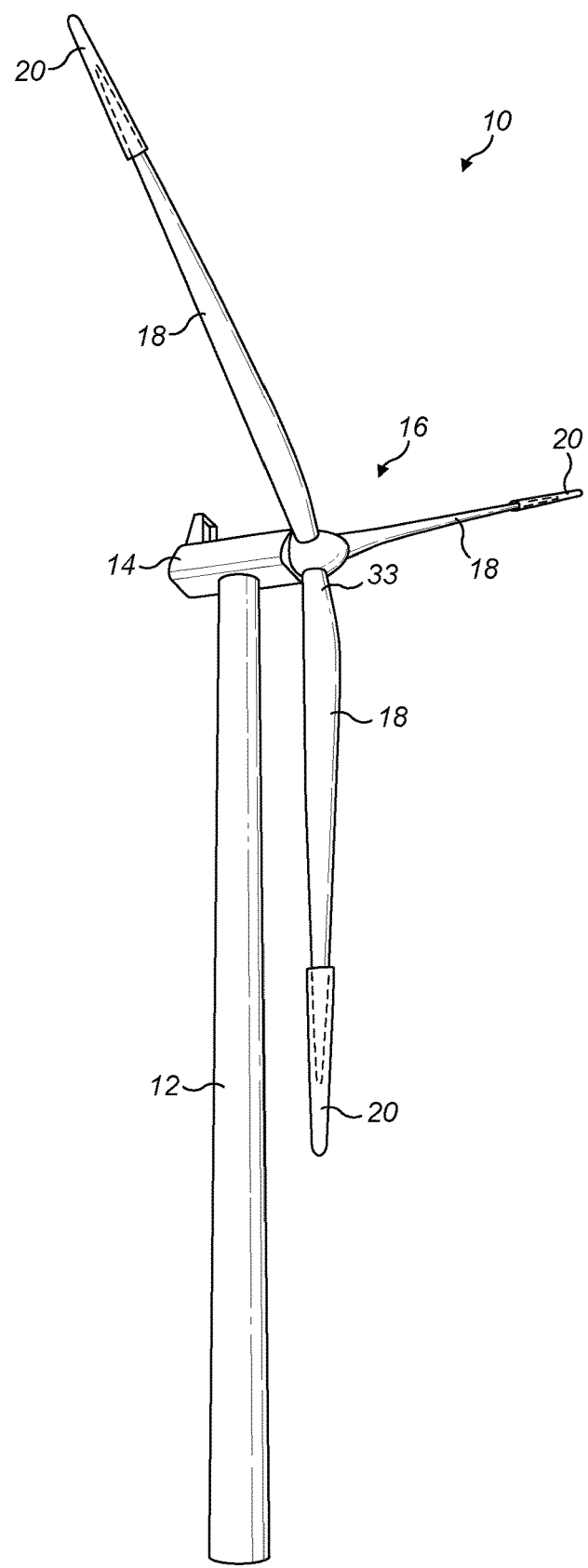
FIG. 1 is a schematic view of a wind turbine having a plurality of blades fitted with tip extensions.

FIG. 1 is a schematic view of a horizontal axis wind turbine 10 according to an embodiment of the present invention. The wind turbine 10 comprises a tower 12 supporting a nacelle 14. A rotor 16 is mounted to the nacelle 14. The rotor 16 comprises a plurality of wind turbine blades 18. In this example, the rotor 16 comprises three blades 18, but in other embodiments the rotor 16 may have any number of blades 18. Each blade 18 is retro-fitted with a blade tip extension (BTE) 20, which extends the effective length of the blade 18.

Figure 2:
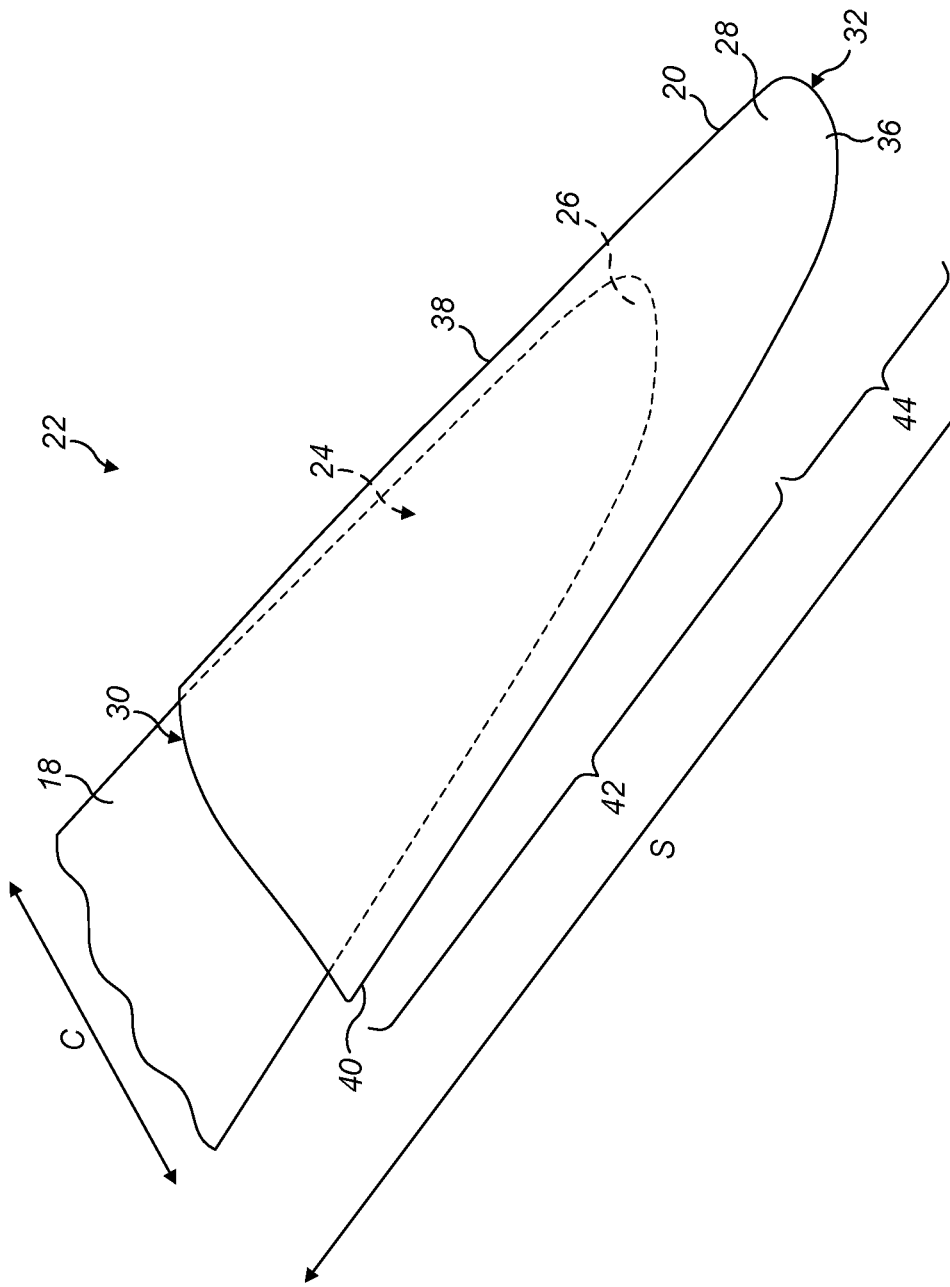
FIG. 2 schematically shows a tip extension fitted to a tip end of a wind turbine blade.

FIG. 2 is a schematic view of a wind turbine blade assembly 22 comprising a wind turbine blade 18 fitted with a blade tip extension 20 according to an embodiment of the present invention. The blade tip extension 20 in this example is in the form of a sock, which fits over a tip end 24 of the blade 18. The tip end 24 of the blade 18 comprises a tip 26. In some embodiments, the tip 26 may optionally be removed from the blade 18 prior to fitting the tip extension 20. The tip extension 20 comprises an outer shell 28 defining a substantially hollow interior for receiving the tip end 24 of the blade 18.

The tip extension 20 has an inboard end 30 and an outboard end 32. When fitted to the blade 18, the inboard end 30 of the tip extension 20 is located closer to a root 33 (see FIG. 1) of the blade 18 than the outboard end 32. The inboard end 30 of the tip extension 20 is open to receive the tip end 24 of the blade 18 to be extended. The outboard end 32 of the tip extension 20 is closed and comprises a tip 36, which forms the tip of the wind turbine blade assembly 22 when the tip extension 20 is fitted to the blade 18.

The outer shell 28 of the tip extension 20 extends longitudinally in a lengthwise ('spanwise') direction S between the open root end 30 towards the tip 36, and extends transversely in a widthwise ('chordwise') direction C between a leading edge 38 and a trailing edge 40. The outer shell 28 defines an airfoil profile in cross-section.

When fitted to the blade 18, an inboard portion 42 (also referred to as an 'overlap portion') of the tip extension 20 overlaps the tip end 24 of the blade 18, and is bonded to the blade 18 as will be discussed in more detail later. An outboard portion 44 of the tip extension 20, comprising the tip-extension tip 36, serves to extend the overall length of the blade 18.

In this example the blade tip extension 20 has an overall length of approximately three metres. The inboard portion 42 has a length of approximately two metres, whilst the outboard portion 44 has a length of approximately one metre. Accordingly, when fitted to an existing blade 18, the tip extension 20 extends the length of the blade 18 by approximately one metre, and provides a two-metre overlap. This size of tip extension is suitable for blades having an original length of approximately 40 metres. However, in other examples the tip extension may have other dimensions, and/or may be sized to fit blades having a different length. These dimensions are therefore exemplary only and are not intended to limit the scope of the invention.

Further details of the tip extension 20 in terms of its construction and method of attachment to the blade 18 will now be discussed with reference to the remaining figures.

Figure 3:
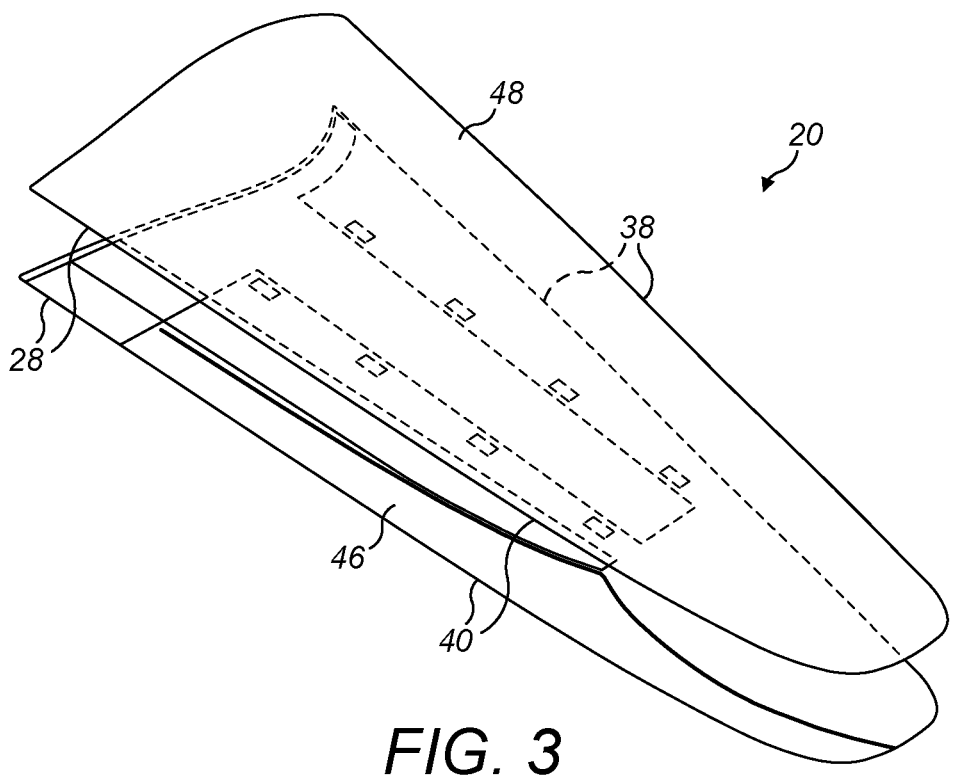
FIG. 3 shows first and second half shells forming the tip extension.

Referring to FIG. 3, the outer shell 28 of the tip extension 20 is formed from first and second half shells 46, 48, which are bonded together along their leading and trailing edges 38, 40 to form the blade tip extension 20. Each half shell 46, 48 in this example is of composite construction. The half shells 46, 48 are preferably each formed in a respective mould. The moulding process may involve resin infusion or prepreg techniques, which are known to the skilled person who is familiar with the construction of wind turbine blade shells.

For example, a typical resin infusion process may involve arranging a number of layers of reinforcing material such as glass- or carbon-fibre fabric in the mould to form a layup. The layup may be covered with a layer of vacuum film to form a sealed region encapsulating the layup. A vacuum pump may be used to remove air from the sealed region, and resin may be admitted into the sealed region. The resin infuses between the fabric layers. The resin subsequently cures to form the finished composite shells.

Figure 4:
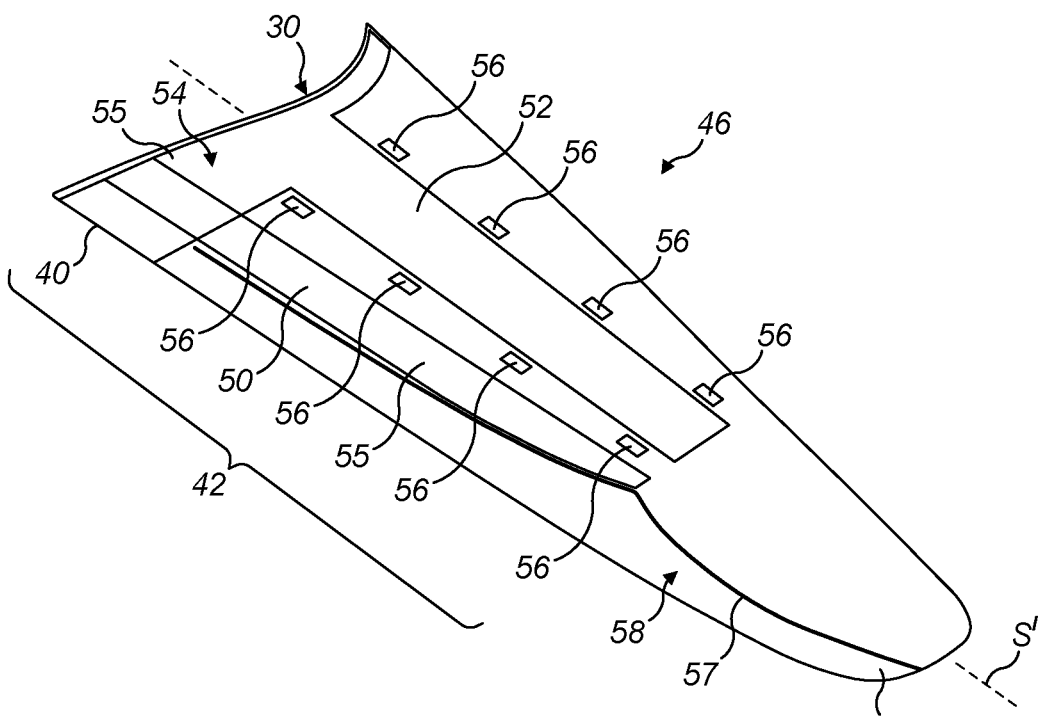
FIG. 4 shows the first half shell of the tip extension in isolation.

Referring to FIG. 4, this shows the first half shell 46 of the tip extension. Bond regions 50, 52 are defined on an inner surface 54 of the half shell 46 in the inboard portion 42 of the tip extension 20. As will be described in further detail later, when the tip extension 20 is fitted to the blade 18, these regions 50, 52 of the tip extension 20 are bonded to corresponding bond regions defined on the outer surface of the blade 18. In this example, the bond regions 50, 52 extend longitudinally in the inboard portion 42 of the half shell 46. The bond regions 50, 52 are spaced apart from one another in the chordwise direction of the half shell 46.

The bond regions 50, 52 are arranged such that when the tip extension 20 is fitted to the blade 18, a first bond region 50 overlaps a trailing edge region of the blade 18, whilst a second bond region 52 overlaps a spar cap region of the blade 18. The first and second bond regions 50, 52 are therefore referred to hereafter as the 'trailing edge bond region' 50 and the 'spar cap bond region' 52 respectively.

A layer of peel ply 55 is provided in the bond regions 50, 52 in this example. The peel ply layer 55 may be provided as the uppermost layer in the layup when forming the half shell 46 such that it is exposed on the inner surface 54 of the half shell 46. The peel ply layer 55 includes a protective sheet, which is removed after the moulding process to expose a rough surface in the bond regions 50, 52. The rough surface advantageously functions as a keying surface for the adhesive when the tip extension 20 is bonded to the blade 18. The keying surface enhances the bond strength between the tip extension 20 and the blade 18.

Spacers 56 are provided on the inner surface 54 of the first half shell 46, outside the bond areas 50, 52. The spacers 56 ensure that there is adequate space for adhesive between the bond regions 50, 52 and the outer surface of the blade 18 when the tip extension 20 is fitted to the blade 18.

An adhesive dam 57 is provided on the inner surface 54 of the first half shell 46 in a trailing edge region 58 of the half shell 46 near the trailing edge 40. The adhesive dam 57 in this example comprises a strip or tape, which is preferably made from a compressible material such as foam. Foam has particularly advantages in this context, which will be discussed in detail later. In this example, the adhesive dam is made from PVC (polyvinyl chloride) foam. The PVC foam strip 57 has approximate dimensions of 5×10 millimetres in terms of height and width. The strip is added to the first half shell 46 after the half shell 46 is finished but before the two half shells 46, 48 are bonded together. The PVC foam strip 57 includes an adhesive film on one side to facilitate attachment to the inner surface 54 of the first half shell 46.

The adhesive dam 57 serves to contain adhesive that is used to bond together the trailing edges 40 of the first and second half shells 46, 48 during manufacture of the tip extension 20, as discussed further below with reference to FIGS. 5 and 6. The adhesive dam 57 extends longitudinally in the spanwise direction S (see FIG. 2). The adhesive dam is spaced from the trailing edge 40 of the first half shell 46 in the chordwise direction. In this example, the adhesive dam 57 extends in the spanwise direction generally parallel to the trailing edge 40 of the first half shell 46, and hence it extends non-parallel to a spanwise axis S' of the first half shell 46. In this example, the adhesive dam 57 extends longitudinally from the near the tip 36 to near the root 30 of the half shell 46. Other configurations of the adhesive dam 57 may be used in other embodiments.

Whilst not shown, the inner surface of the second half shell 48 of the tip extension 20 is configured similarly to the first half shell 46 in that it also includes corresponding bond regions, peel ply in the bond regions and spacers outside of the bond regions. However, in this example, the adhesive dam 57 is associated only with the first half shell 46. In other examples, the adhesive dam 57 may instead be applied to the second half shell 48, or adhesive dams may be applied to both the first and second half shells 46, 48 and optionally those adhesive dams may be arranged in contact when the half shells 46, 48 are bonded together.

Figure 5:
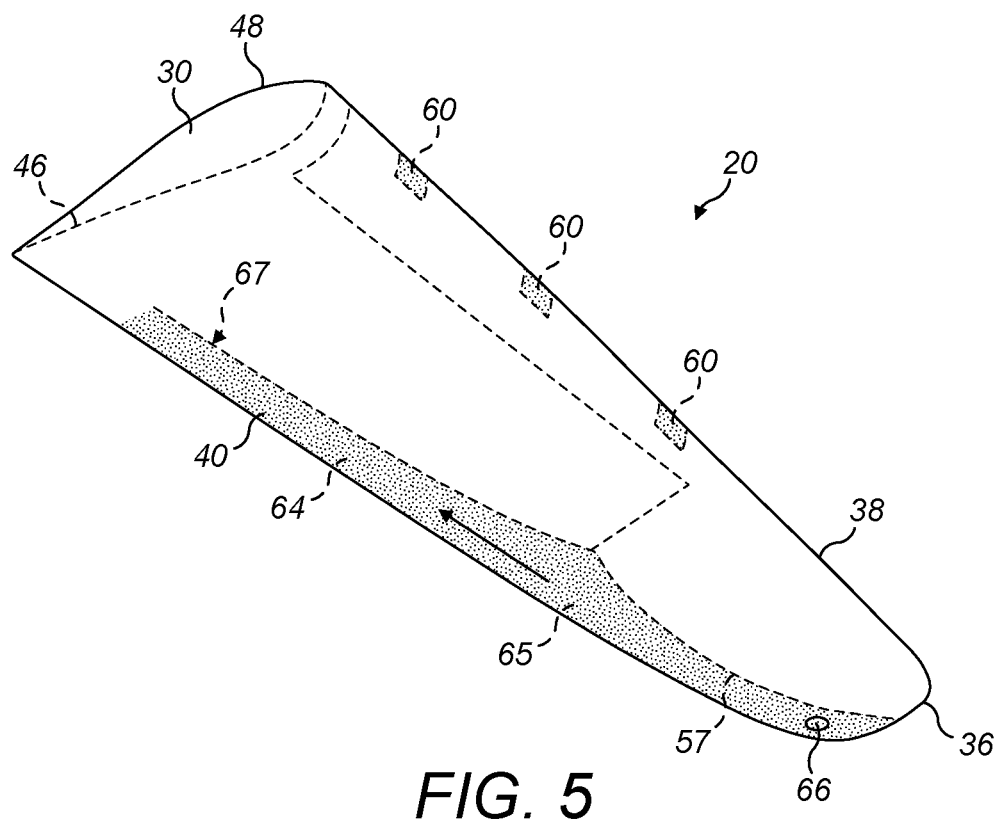
FIG. 5 shows the first and second half shells of the tip extension bonded together by adhesive.

Referring to FIG. 5, this illustrates the process of bonding the first and second half shells 46, 48 together to form the tip extension 20. In this example, adhesive 60 is first applied at a plurality of discrete locations spaced along the leading edge 38 of the first half shell 46. The second half shell 48 is positioned into a jig and then lowered into position on top of the first half shell 46 such that the leading and trailing edges 38, 40 of the respective half shells 46, 48 are mutually aligned. The half shells 46, 48 may then be clamped in place. The adhesive 60 at the leading edge 38 forms a series of spot bonds between the two shells 46, 48 at their aligned leading edges 38. These spot bonds hold the two half shells 46, 48 of the tip extension 20 together sufficiently to allow the leading edge 38 of the tip extension 20 to be over-laminated. The over-lamination process preferably involves applying layers of prepreg glass-fibre fabric across the interface of the half shells 46, 48 at the leading edge 38 using hand layup.

When the second half shell 48 is positioned on top of the first half shell 46, the adhesive dam 57 arranged at the trailing edge 40 of the first half shell 46 is preferably compressed slightly by the inner surface 62 (indicated in FIG. 9) of the second half shell 48. A trailing edge bond cavity 64 is defined between the two half shells 46, 48, which is bound by the adhesive dam 57 and the respective trailing edges 40 of the two half shells 46, 48. In this example, adhesive 65 is injected into the trailing edge bond cavity 64. The adhesive 65 is injected through at least one hole 66 provided in at least one of the half shells 46, 48. The hole(s) 66 communicate with the trailing edge bond cavity 64. In this example, a hole 66 is provided near the tip 36 of the second half shell 48. The injected adhesive 65 flows longitudinally from the tip 36 towards the open root end 30 of the tip extension 20.

The adhesive dam 57 advantageously allows the position of the trailing edge bond line between the two half shells 46, 48 to be precisely defined. Without the adhesive dam 57, it would not be possible to control the chordwise position of the bond line. In particular, it would not be possible to control the position of the face 67 of the adhesive 65 that faces toward the leading edge 38 of the tip extension 20 (best shown in FIG. 6). If the adhesive 65 was to spread too far in the chordwise direction (i.e. too far towards the leading edge 38 of the tip extension 20) then it may prevent the tip extension 20 from fitting correctly to the blade 18. This is illustrated by way of example in FIG. 6, and discussed below.

Figure 6:
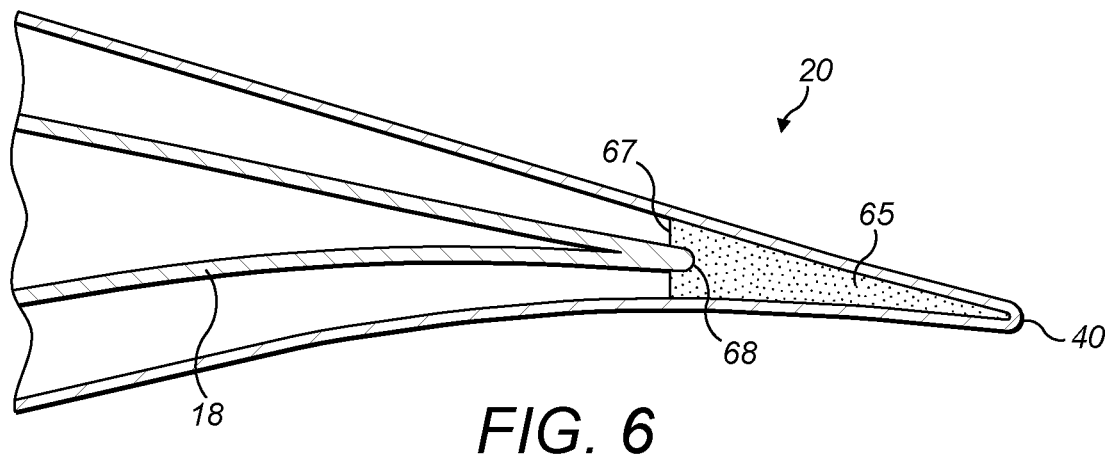
FIG. 6 schematically illustrates a clash condition between a trailing edge of the blade and cured adhesive inside the trailing edge of the tip extension.

FIG. 6 shows schematic cross sections through trailing-edge portions of a blade 18 and a tip extension 20 in the case where the tip extension 20 is not provided with an adhesive dam. In this example, the absence of an adhesive dam means that the adhesive 65 has migrated too far in the chordwise direction away from the trailing edge 40 since it is not constrained by an adhesive dam. The cured adhesive 65 clashes with the trailing edge 68 of the blade 18 and prevents the tip extension 20 from fitting over the blade 18. The provision of a trailing-edge dam 57 in the tip extension 20 therefore prevents such clashes from occurring. It will be appreciated that the risk of a clash is only associated with the overlap region 42 of the tip extension 20 and is not a problem that exists with the outboard region 44.

Whilst the above example describes the injection of adhesive 65 at the trailing edge 40, the trailing edge bond between the two half shells 46, 48 of the tip extension 20 could instead be formed by applying adhesive directly to one of the half shells 46, 48 prior to positioning the half shells 46, 48 together. This technique is conventionally used when joining two half shells of a wind turbine blade together. However, injection of adhesive has been found to be preferable particularly in the case of a curved tip extensions (such as the curved tip extension 20b shown in FIG. 17 and discussed later) since the curved geometry of the shells does not always produce a satisfactory bond line using the conventional bonding process.

Figure 7:
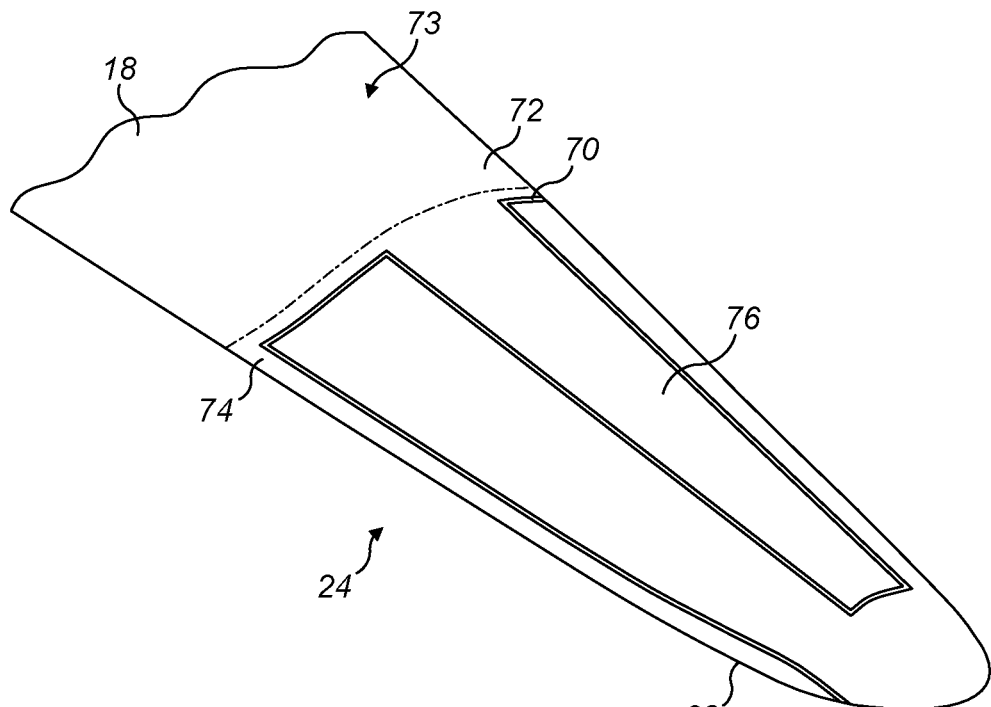
FIG. 7 shows adhesive dams applied to the tip end of a blade prior to fitting the tip extension.

Referring now to FIG. 7, this shows the tip end 24 of a conventional wind turbine blade 18, which has been prepared for mounting of a tip extension. Prior to attaching the tip extension, adhesive dams 70 are provided on the outer surface 72 of the blade 18 on both the pressure and suction sides of the blade 18, although only the suction side 73 of the blade 18 is visible in FIG. 7. The adhesive dams 70 are bonded to the outer surface 72 of the blade 18 and are arranged to extend along pre-defined boundaries of bond regions 74, 76 defined on the outer surface 70 of the blade 18. In this example, a trailing edge bond region 74 is defined near the trailing edge 68 of the blade 18 and a spar cap bond region 76 coincides with a position of a spar cap of the blade 18. It will be appreciated that the position of these bond regions 74, 76 is selected to coincide with the bond regions 50, 52 defined on the inner surface 54 of the tip extension 20, which were described previously with reference to FIG. 4. The adhesive dams 70 applied to the outer surface 72 of the blade 18 ensure that adhesive subsequently applied to bond the tip extension 20 to the blade 18 is contained within these bond regions 74, 76.

The adhesive dams 70 may alternatively be provided inside the tip extension 20 during manufacture of the tip extension 20. However, it is advantageous to apply these dams 70 to the blade 18 because the tip extension 20 may be in storage for some time before it is used, which may cause the dams 70 to deteriorate. By installing these dams 70 on the blade 18 at the time of installation of the tip extension 20, it can be ensured that the dams 70 are of high quality without deterioration.

Once the adhesive dams 70 have been applied to the outer surface 72 of the blade 18, the blade 18 is ready to receive the tip extension 20. Optionally, prior to fitting the tip extension 20, the bond regions 74, 76 defined on the outer surface 72 of the blade 18 may be further prepared. For example the gel coat and/or paint on the outer surface 72 of the blade 18 may be removed and the bond regions 74, 76 may be cleaned and/or sanded to enhance keying to the adhesive.

Figure 8:
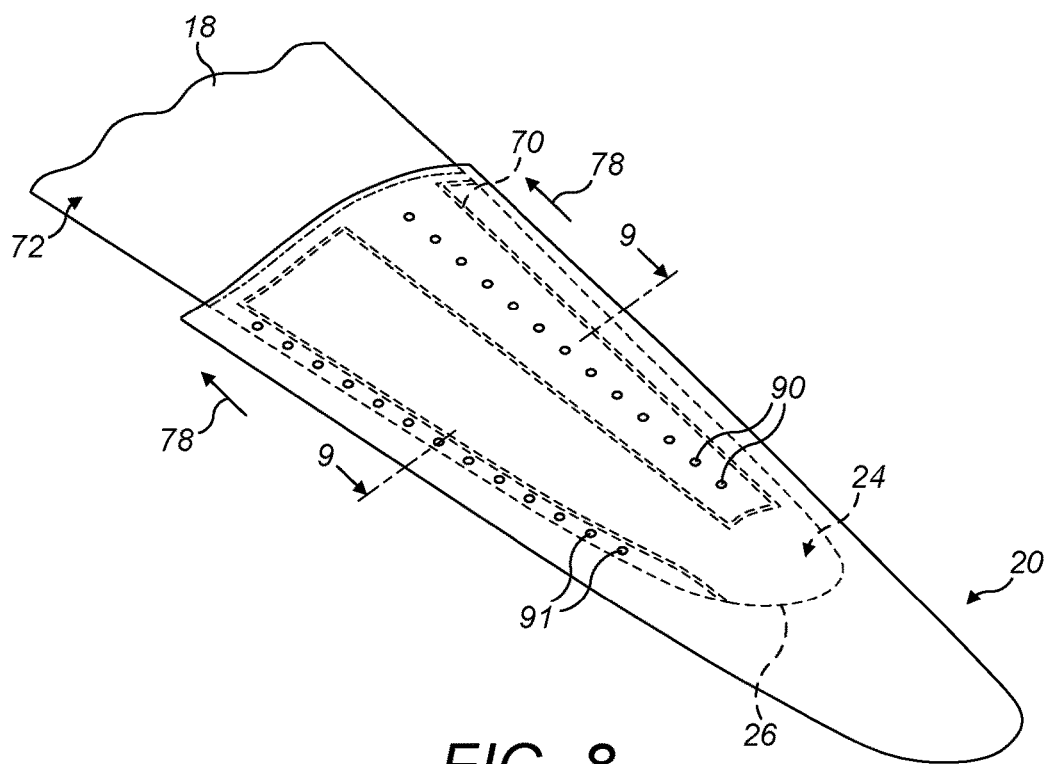
FIG. 8 shows the tip extension fitted over the tip end of the blade and shows a plurality of pre-drilled injection holes provided in the tip extension.

Referring now to FIG. 8, the tip extension 20 is inserted over the prepared tip end 24 of the blade 18. The process initially involves aligning the tip 26 of the blade 18 with the open end 30 of the tip extension 20. Once aligned, the tip extension 20 is pulled or pushed over the tip end 24 of the blade 18 in the direction of the arrows 78, i.e. towards the root of the blade 18.

The use of conventional foam (e.g. a PVC foam strip) to form the dams 70 makes it difficult to fit the tip extension 20 to the blade 18. This is caused by a build up of friction between the dams 70 and the inner surfaces 54, 62 (indicated in FIG. 9) of the tip extension 20, which makes it difficult to slide the tip extension 20 over the blade 18. Lower density foam dams have been found to have a tendency to tear apart when sliding the tip extension onto the blade 18.

Figure 7A:
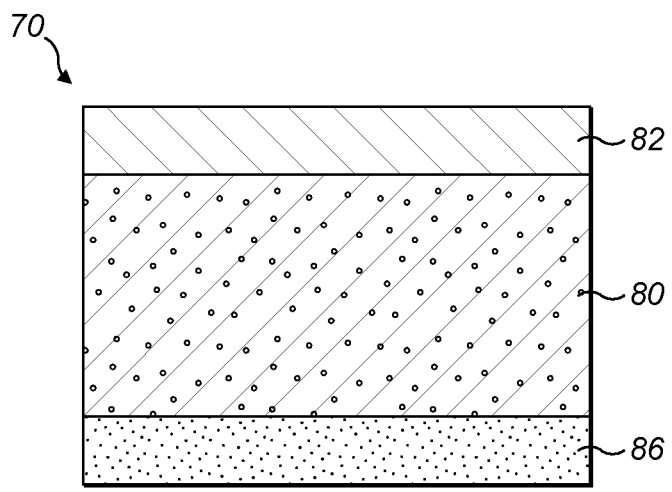
FIG. 7a is a schematic cross-sectional view of an adhesive dam having a friction-reducing upper layer and an adhesive lower layer.

Preferably, the adhesive dams 70 may be formed from or comprise materials that minimise friction between the dams 70 and the tip extension 20. In this example, and as illustrated schematically in FIG. 7a, the adhesive dams 70 comprise a strip or tape 80 having a friction-reducing layer 82 on one side. The tape 80 may be made from foam, e.g. PVC foam. The friction-reducing layer 82 in this example is a layer of polytetrafluoroethylene (PTFE) e.g. Teflon™. The PTFE friction-reducing layer 82 advantageously allows the tip extension 20 to slide over the blade 18 without a build up of friction. An adhesive layer 86 is preferably provided on the other side of the tape 80 to facilitate attachment of the adhesive dam 70 to the surface of the blade 18.

The PTFE layer 82 is preferably and advantageously provided as an integral layer of the adhesive dam 70. For example, the PTFE layer 82 may be provided during manufacture of the dams 70. The dams 70 are preferably manufactured in sheet form, wherein a layer of PTFE is bonded to an upper surface of a sheet of PVC foam, and a layer of adhesive may be bonded to the lower surface of the sheet. The sheet may then be slit to the required width of the tape to form the dams 70.

Whilst the PTFE layer 82 may be applied subsequently to the dams 70, for example after the dams 70 have been manufactured or after the dams 70 have been applied to the blade 18, there is a risk of such subsequently-applied PTFE layers 82 becoming displaced or detached from the dams 70 during fitting of the tip extension 20 to the blade 18. If the PTFE layer 82 or part of it is displaced into the bond regions 74, 76 (shown in FIG. 7) then it may act as a crack initiator. It is therefore preferable and advantageous to integrate the PTFE layer 82 into the structure of the dams 70 to avoid such problems. It also facilitates attachment of the tip extension 20 as there is no need to apply a PTFE layer 82 or other friction-reducing substances to the dams 70 during the attachment process.

When the tip extension 20 is pulled or pushed over the blade 18, the adhesive dams 70 applied to the blade 18 become sandwiched between the tip extension 20 and the blade 18. It can be seen in FIG. 8 that the tip extension 20 includes a plurality of pre-drilled holes 90, 91. As will be discussed in further detail later with reference to FIG. 10, the holes 90, 91 are used for supplying adhesive between the blade 18 and the tip extension 20 in order to bond the tip extension 20 to the blade 18.

In this example there are two rows of pre-drilled holes 90, 91 in each half shell 46, 48 of the tip extension 20 (for ease of illustration, only certain holes are provided with reference numerals in FIG. 8). Each row extends in a longitudinal (spanwise) direction and comprises a plurality of mutually-spaced holes 90, 91. The holes 90, 91 are arranged to communicate with bond cavities 94, 96 (indicated in FIG. 9) defined between the outer surface 72 of the blade 18 and the inner surfaces 54, 62 of the tip extension 20, as will be discussed in further detail below with reference to FIG. 9, which is a schematic cross-section taken along the line 9-9 in FIG. 8, i.e. through the tip end 24 of the blade 18 when overlapped by the inboard portion 42 of the tip extension 20.

Figure 9:
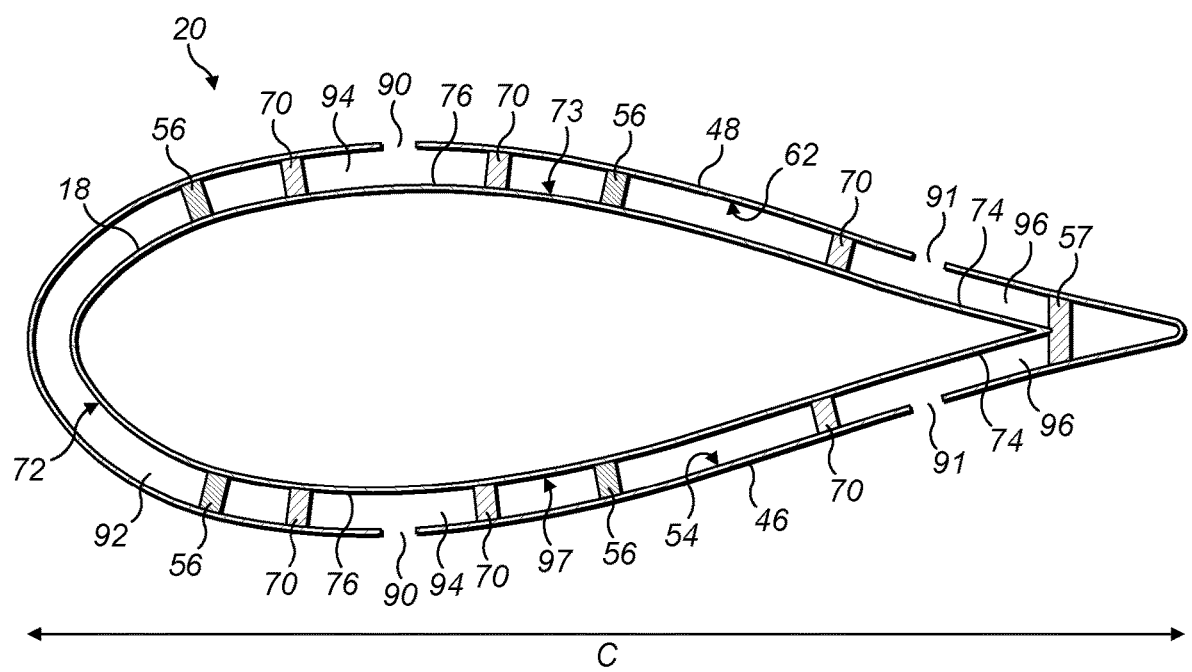
FIG. 9 is a schematic cross-section taken along the line 9-9 in FIG. 8.

Referring to FIG. 9, when the tip extension 20 is fitted to the blade 18, an overlap region 92 is defined between the outer surface 72 of the tip end 24 of the blade 18 and the inner surfaces 54, 62 of the inboard portion 42 of the tip extension 20. A plurality of bond cavities 94, 96 are defined in the overlap region 92. In this example, the bond cavities 94, 96 are at least partially defined by the adhesive dams 70 applied to the blade 18, and which are sandwiched between the blade 18 and the inner surfaces 54, 62 of the tip extension 20. Specifically, spar cap bond cavities 94 are defined between the opposed spar cap bond regions 76 of the blade shell 18 and the inner surfaces 54, 62 of the tip extension 20, and trailing edge bond cavities 96 are defined between the opposed trailing edge bond regions 74 of the blade shell 18 and the inner surfaces 54, 62 of the tip extension 20. As shown in FIG. 9, the bond cavities 94, 96 are defined on both the windward and leeward sides 97, 73 of the blade 18.

The spar cap bond cavities 94 are each bound in the chordwise direction C by the adhesive dams 70 applied to the surface 72 of the blade 18. The trailing edge bond cavities 96 are bound in the chordwise direction C by the trailing edge adhesive dam 57 provided in the tip extension 20 and by the trailing edge adhesive dams 70 applied to the surface 72 of the blade 18.

FIG. 9 also shows the spacers 56, which were discussed previously with reference to FIG. 4. The spacers 56 ensure that there is a minimum separation distance between the outer surface 72 of the blade 18 and the inner surfaces 54, 62 of the tip extension 20, so that there is sufficient space in the bond cavities 94, 96 for adhesive. Preferably, the spacers 56 are substantially incompressible.

Still referring to FIG. 9, it can be seen that the holes 90 provided in the spar cap bond region 52 of the tip extension 20 communicate with the spar cap bond cavities 94, whilst the holes 91 provided in the trailing edge bond region 50 of the tip extension 20 communicate with the trailing edge bond cavities 96.

Figure 10:
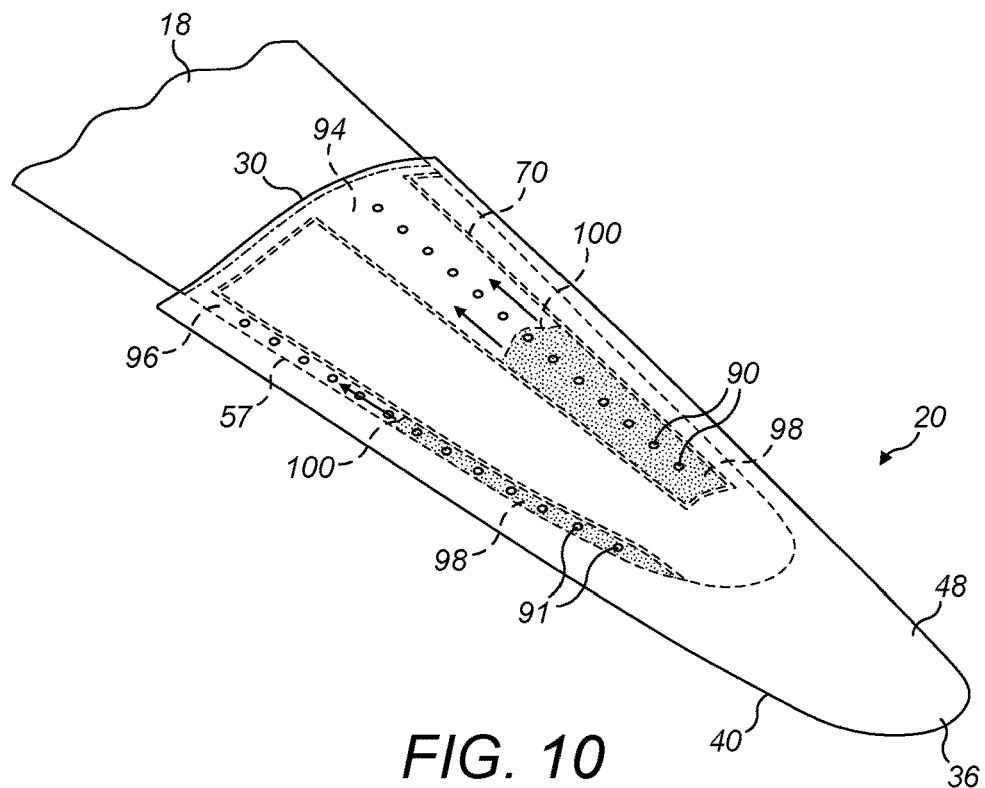
FIG. 10 illustrates the process of bonding the tip extension to the blade, in which adhesive is supplied through the injection holes in the tip extension.

Referring now to FIG. 10, this illustrates the process of bonding the tip extension 20 to the blade 18. The process involves injecting adhesive 98 through the holes 90, 91 provided in the tip extension 20 (see also FIG. 10a, which shows adhesive 98 being injected through a hole 90a). For each bond, the adhesive 98 is first injected through the hole 90, 91 closest to the tip 36 of the tip extension 20. The adhesive 98 begins to fill the associated bond cavity 94, 96 and spreads out to fill the part of the bond cavity generally beneath the hole 90, 91, whilst being constrained by the adhesive dams 57, 70 discussed previously. The injection process continues by injecting adhesive through the adjacent hole 90, 91 in the series. Essentially, adhesive 98 is injected through each hole 90, 91 in the series sequentially, starting at the hole 90, 91 closest to the tip 36 and moving from hole-to-hole towards the root end 30 of the tip extension 20.

Figure 10A:
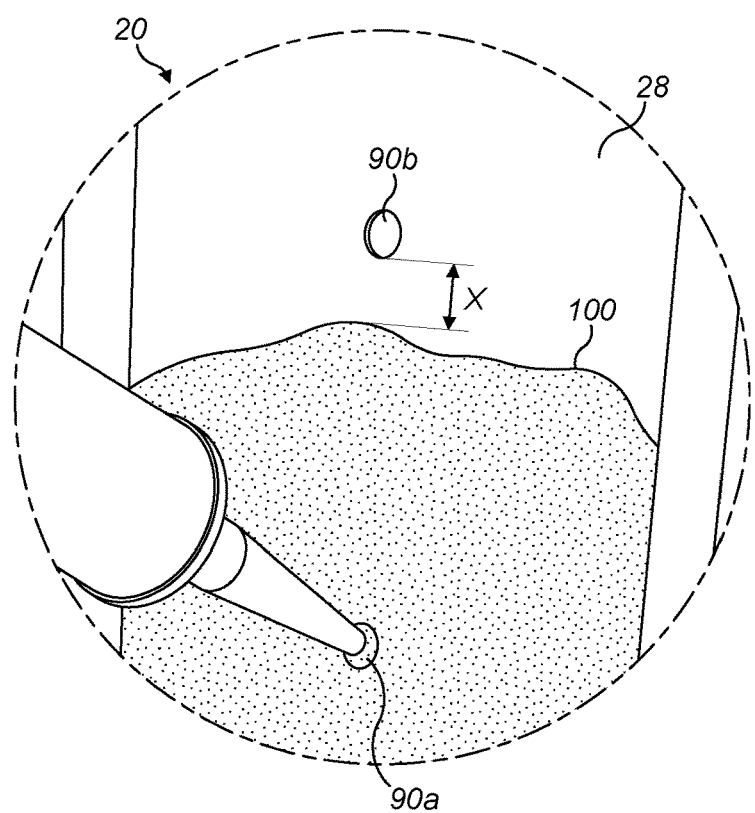
FIG. 10a is a close-up view showing adhesive being injected through an injection hole.

As shown in FIG. 10a, the shell 28 of the tip extension 20 in this example is advantageously translucent, since it is composed of glass-fibre composite. This allows the flow front 100 of the adhesive 98 to be visually inspected during the injection process. When the flow front 100 begins to approach the next hole 90b in the series, the injection process through the current hole 90a is terminated and adhesive is injected through that next hole 90b. In this example, the injection through a hole 90a is terminated when the flow of adhesive is within a predetermined distance 'x' from the next hole 90b (in this example, the predetermined distance x is approximately 25 mm), and injection through that next hole 90b then commences.

The process of injecting adhesive sequentially through the series of holes 90, 91 moving from tip 36 to root 30 advantageously prevents air lock offs and avoids voids forming in the bonds. In addition, stopping adhesive injection within the pre-determined distance also reduces the back pressure of adhesive, and therefore reduces the risk of breaching the adhesive dams. The root end 30 of the tip extension 20 is open, hence air can escape through this open end 30 as the adhesive flow front 100 moves generally in a longitudinal direction towards the open root end 30. Air can also escape through the next hole in the series of holes 90, 91. Further, the adhesive dams 57, 70 in this example are advantageously permeable to air, i.e. they are not air tight, hence air can escape through the adhesive dams 57, 70. The bonding process described herein therefore provides an excellent and durable bond between the tip extension 20 and the blade 18 in precisely defined positions and without voids.

It was discussed above with reference to FIG. 6 that the provision of an adhesive dam 57 near the trailing edge 40 of the tip extension 20 allows the position of the bond line between the two half shells 46, 48 of the tip extension 20 to be precisely defined so that the possibility of the tip extension 20 clashing with the blade trailing edge 68 is avoided during attaching of the tip extension 20. Further details, functions and advantages of this adhesive dam 57 will now be discussed with reference to FIGS. 11 to 14.

Figure 11:
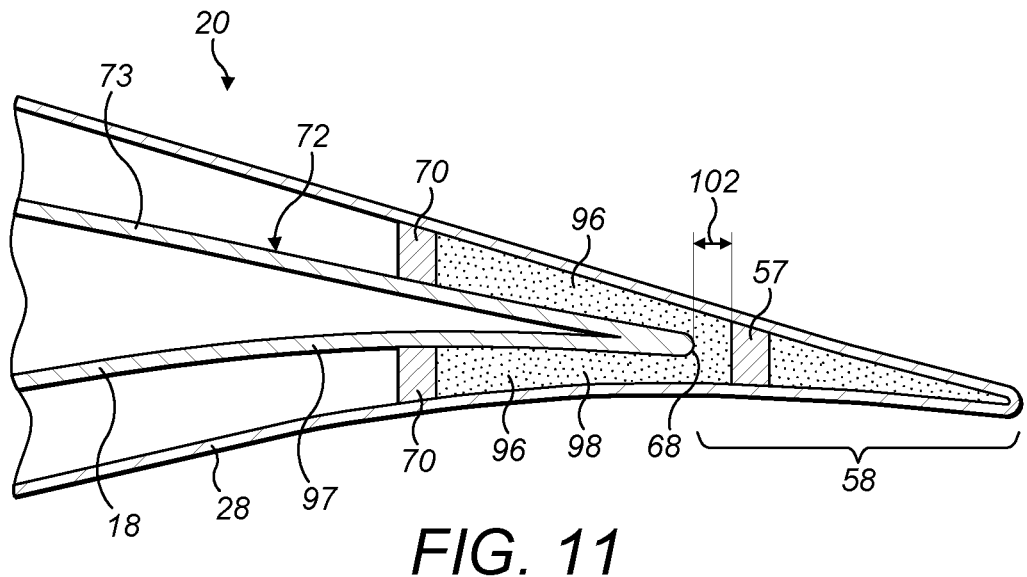
FIG. 11 is a schematic cross-sectional view of a trailing edge region of a tip extension fitted to a blade, illustrating an adhesive dam provided in the trailing edge region of the tip extension and which is spaced apart from the trailing edge of the blade.

Referring to FIG. 11, this schematically illustrates one potential arrangement of the adhesive dam 57 provided in the trailing edge region 58 of the tip extension. In this example, the adhesive dam 57 is located such that when the tip extension 20 is fitted to the blade 18, there is a gap 102 in the chordwise direction between the adhesive dam 57 and the trailing edge 68 of the blade 18. Whilst this position of the adhesive dam 57 avoids a clash condition, it presents certain problems. In particular, when adhesive 98 is injected into the trailing edge bond cavities 96, the adhesive 98 must flow around the trailing edge 68 of the blade 18 from the leeward side 73 to the windward side 97 (or vice versa). This inevitably causes air lock-offs, resulting in voids in the adhesive 98 in the trailing edge bond cavities 96 and leading to a sub-optimal bond at the trailing edge 68.

Figure 12:
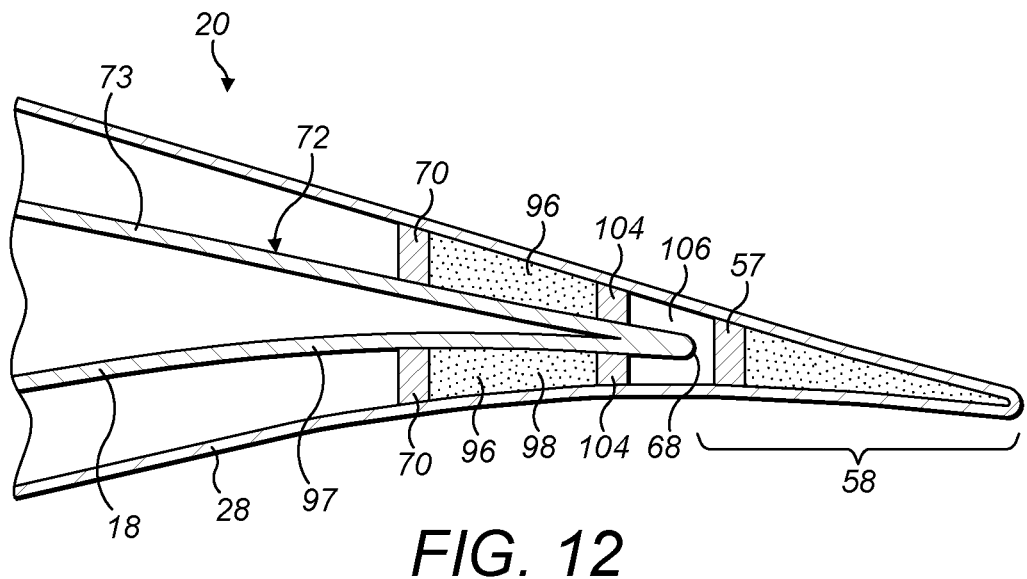
FIG. 12 schematically illustrates an alternative arrangement of adhesive dams in which an additional adhesive dam is provided near the trailing edge of the blade.

Referring now to FIG. 12, this schematically illustrates a possible configuration that avoids the adhesive 98 needing to travel around the trailing edge 68 of the blade 18. In this example, additional dams 104 are provided on the pressure and suction surfaces 97, 73 of the blade 18 near the trailing edge 68. The additional dams 104 prevent the adhesive 98 from flowing around the trailing edge 68 of the blade 18, and hence avoid air lock-offs in the trailing edge bond cavities 96 when the tip extension 20 is bonded to the blade 18. Whilst these additional dams 104 prevent voids occurring in the adhesive 98 in the trailing edge bond cavities 96, they result in a relatively narrow bond line (in the chordwise direction) between the blade 18 and the tip extension 20 at the trailing edge 68 of the blade 18. Furthermore, a void 106 is also formed between the trailing edge 68 of the blade 18 and the adhesive dam 57 in the tip extension 20. A void 106 in this position is undesirable because moisture may build up in this void 106, necessitating the need for drain holes in the tip extension 20. Additionally, in the event of a lightning strike on the blade 18, air or moisture in this void 106 may expand and could burst open the void 106, i.e. burst through the shell 28 of the tip extension 20. Therefore, whilst the provision of additional adhesive dams 104 overcomes certain problems, it also presents additional ones.

Figure 13:
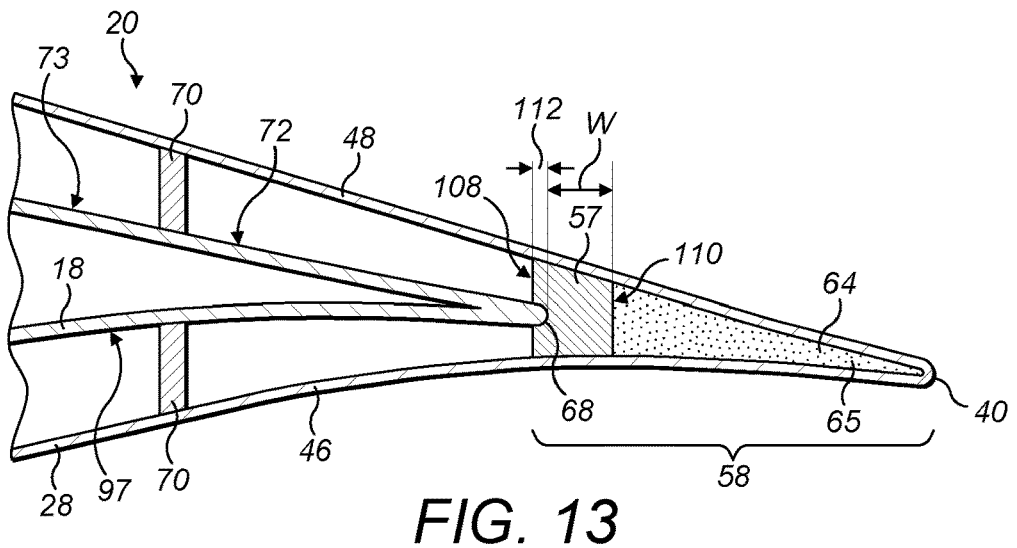
FIGS. 13 and 14 schematically illustrate a preferred arrangement of the adhesive dam at the trailing edge of the tip extension, in which the trailing edge of the blade cuts into the adhesive dam.

Referring now to FIG. 13, this schematically illustrates a preferred and particularly advantageous configuration of the adhesive dam 57 provided in the trailing edge region 58 of the tip extension 20. In this example, the adhesive dam 57 is advantageously made from foam.

The adhesive dam 57 comprises a leading surface 108, which faces the leading edge 38 (indicated in FIG. 5) of the tip extension 20 and a trailing surface 110 which faces the trailing edge 40 of the tip extension 20. As discussed previously, the dam 57 is spaced apart from the trailing edge 40 such that a trailing edge cavity 64 is defined behind the dam 57, i.e. between the dam 57 and the trailing edge 40 of the tip extension 20. More specifically, the cavity 64 is defined between the trailing surface 110 of the dam 57 and the trailing edge 40 of the tip extension 20. The cavity 64 is filled with adhesive 65 during construction of the tip extension 20 to bond the two half shells 46, 48 of the outer shell 28 of the tip extension 20 together, as previously described.

The chordwise location of the foam dam 57 in the tip extension is selected such that the trailing edge 68 of the blade 18 projects into the foam when the tip extension 20 is fitted to the blade 18. More specifically, the chordwise location of leading surface 108 of the dam 57 is selected such that the trailing edge 68 of the blade 18 projects into the foam 57 when the tip extension 20 is fitted to the blade 18. The chordwise location of the leading surface 108 may selected by suitable selection of the chordwise position of the dam 57 and the chordwise width of the dam 57. During fitting of the tip extension 20, i.e. as the tip extension 20 slides on to the blade 18, the trailing edge 68 of the blade 18 effectively cuts into the foam dam 57. This may involve the trailing edge 68 compressing or cleaving the dam 57.

With the trailing edge 68 of the blade 18 projecting into the dam 57, parts of the dam 57 overlap the pressure and suction surfaces 97, 73 of the blade 18 at the trailing edge 68. In other words, the trailing edge 68 is sandwiched between parts of the adhesive dam 57. The trailing edge 68 preferably forms an interference fit with the adhesive dam 57. The adhesive dam 57 may advantageously form an effective seal around the trailing edge 68. The adhesive dam 57 advantageously separates the leeward and windward sides 97, 73 of the blade 18 and blocks any passageway for adhesive around the trailing edge 68 of the blade 18 thus avoiding the problems discussed above with reference to FIG. 11.

Figure 15:
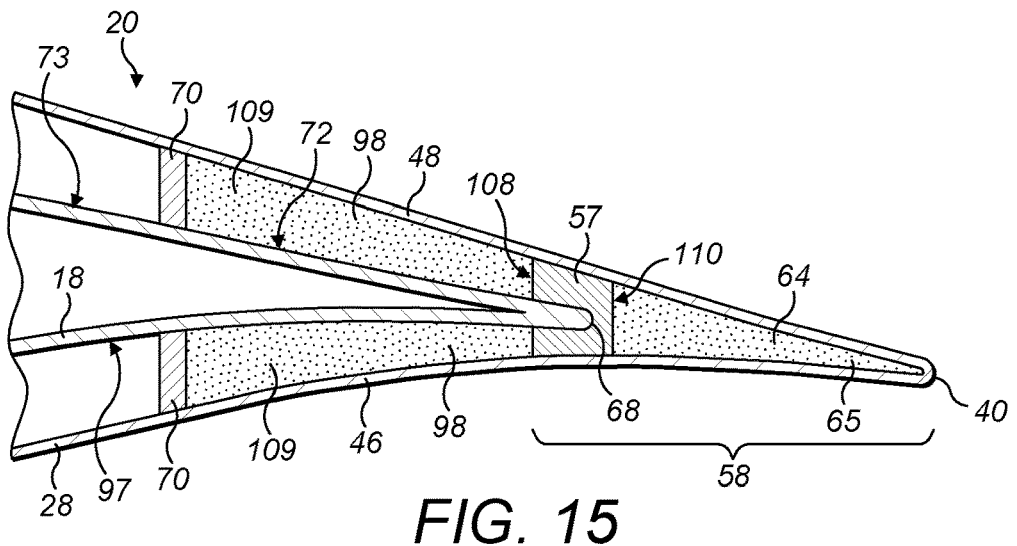
FIG. 15 corresponds to FIG. 14 and additionally shows adhesive bonds between the tip extension and the blade at the trailing edge of the blade.

As shown in FIG. 15, the configuration of the adhesive dam 57 shown in FIG. 13 also enables a relatively wide bond 109 (in the chordwise direction) to be achieved between the blade 18 and the tip extension 20 at the trailing edge 68 of the blade 18, without the need for a void, thereby avoiding the problems discussed above with reference to the arrangement shown in FIG. 12.

In this particular example, the nominal chordwise position of the foam dam 57 in the tip extension 20 may be selected so that the trailing edge 68 of the blade 18 cuts into the foam 57 by approximately five millimetres, as indicated by the arrows 112 on FIG. 13. Due to manufacturing tolerances in the blade 18, the blade 18 may have a slightly wider or narrower chord than the designed dimension. For example, the chord dimension may have a tolerance of +/−five millimetres. The chordwise width W of the foam dam 57 may be suitably selected to accommodate such manufacturing tolerances in the blade dimensions, as discussed below.

Figure 14:
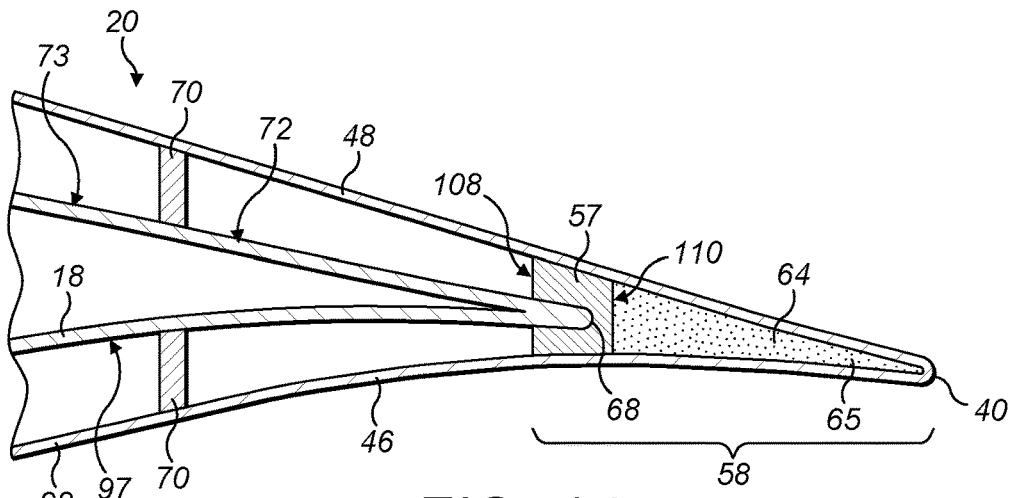

In this example, the foam dam 57 may have a chordwise width W of approximately 10 mm, or slightly greater. Therefore, if the blade 18 has a wider chord than nominal (of up to about 5 mm) the trailing edge 68 will cut further into the foam dam 57 (as shown in FIG. 14) yet the dam 57 will still separate the leeward and windward sides 73, 97 of the blade 18. Alternatively, if the blade 18 has a narrower chord than nominal (of up to about 5 mm) the trailing edge 68 will cut less far into the foam 57, yet the dam 57 will still separate the leeward and windward sides 73, 97 of the blade 18.

The configuration of the adhesive dam 57 illustrated in FIGS. 13 to 15 therefore presents a number of advantages. Firstly, it serves to constrain the adhesive 65 used to bond the two half shells 46, 48 of the tip extension 20 together, allowing the chordwise position of this bond to be defined so that the tip extension 20 fits the blade 18 without clashing (as discussed above with reference to FIG. 6). Secondly, it accommodates manufacturing tolerances in the dimensions of the blade 18. Thirdly, it blocks the passage of adhesive 98 around the trailing edge 68 of the blade 18, thus avoiding air lock-offs, resulting in a superior bond devoid of voids between the blade 18 and the tip extension 20 at the trailing edge 68. Fourthly, it allows the chordwise width of this bond 109 to be maximised.

Figure 16:
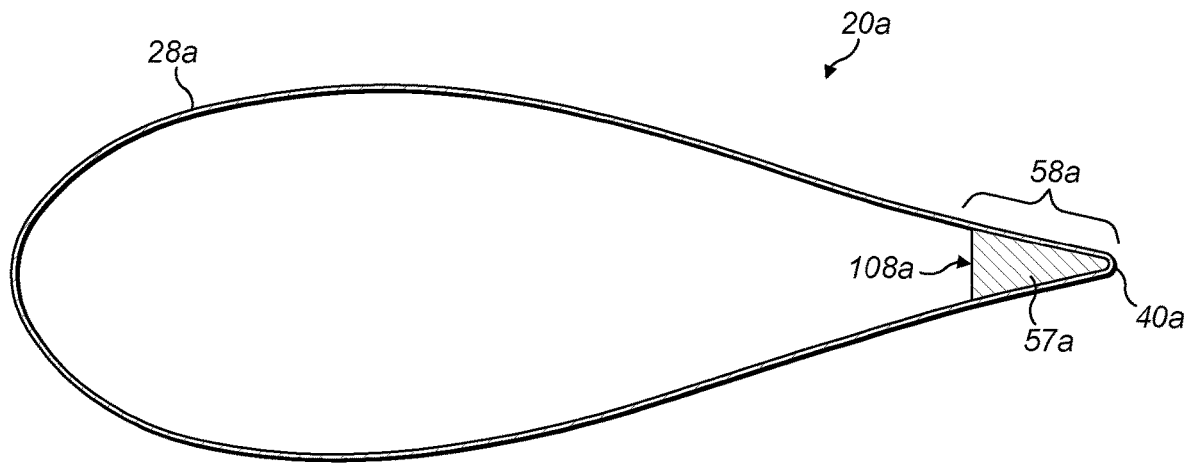
FIG. 16 is a schematic cross-section through a tip extension formed as a single piece and including a foam dam filling a trailing edge region inside the tip extension.

FIG. 16 is a schematic cross section through a blade tip extension 20a according to another embodiment of the present invention. In this example the outer shell 28a of the tip extension 20a is formed from a single piece. This is in contrast to the previous examples where the tip extension 20 is formed from two half shells 46, 48 that are bonded together. In this embodiment an adhesive dam 57a is provided inside the tip extension 20a in the trailing edge region 58a. The adhesive dam 57a in this example is made from foam. The adhesive dam 57a substantially completely fills the trailing edge region 58a inside the tip extension 20a.

Forming the outer shell 28a as a single piece avoids the requirement for an adhesive bond inside the tip extension 20a at the trailing edge 40a (such as the adhesive bond 65 shown in FIG. 13). As the adhesive dam 57a occupies substantially the entire trailing edge region 58a, it advantageously avoids any voids in this region 58a that may accumulate moisture and present problems as discussed previously in connection with voids in this region. The chordwise position of the leading surface 108a of the dam 57a is selected such that when the tip extension 20a is fitted to the blade, the trailing edge of the blade advantageously projects into the leading surface 108a of the dam 57a in the same way as described for previous embodiments. The chordwise position of the leading surface 108a may be selected by suitable selecting of the chordwise width of the dam 57a. Whilst not necessarily being utilised during fabrication of the tip extension 20a, the adhesive dam 57a still provides the second, third and fourth advantages summarised above when incorporated in a tip extension 20a having an outer shell 28a formed from a single piece.

Figure 17:
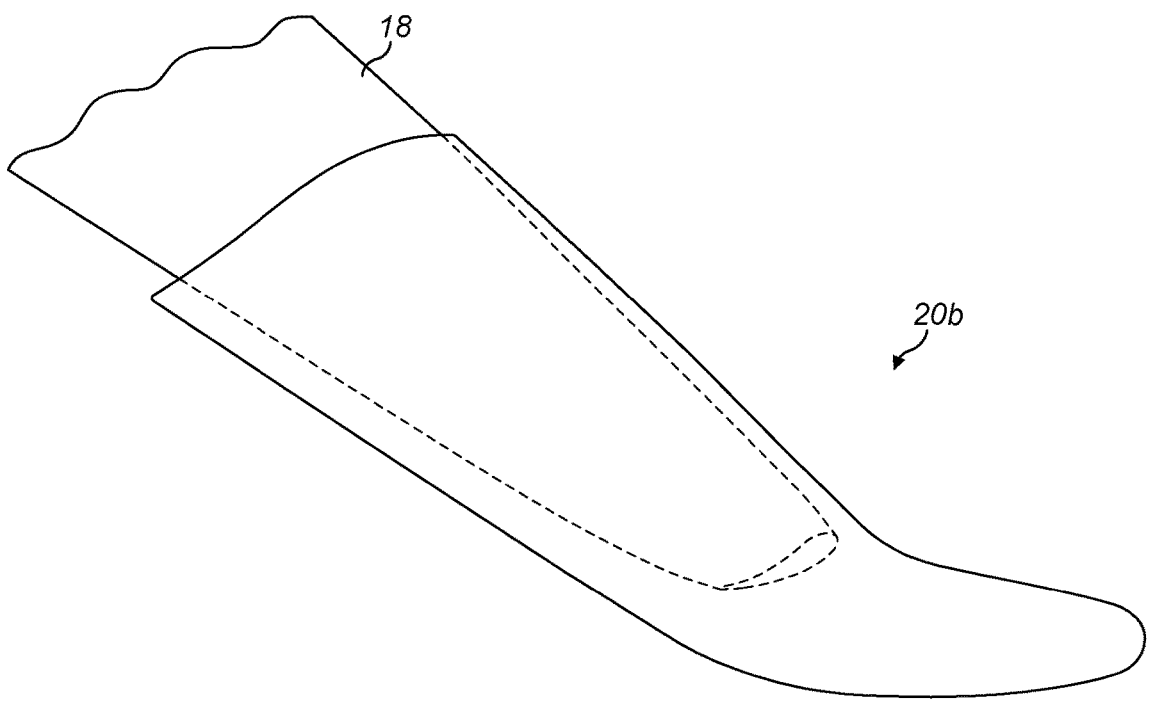
FIG. 17 shows a curved tip extension fitted to a tip end of a wind turbine blade.

FIG. 17 shows a tip extension 20b in accordance with another embodiment of the invention. In this example, the tip extension 20b is curved. When fitted to the blade 18, the tip extension 20b advantageously curves away from the tower in order to prevent the extended blade 18 from striking the tower in use. The risk of tower strike may increase when extending the length of a blade 18, so the curved tip extension 20b advantageously mitigates this risk. Alternatively, or additionally, the curved tip extension 20b may be suited to fit blades that already have a curved tip. The curved tip extension 20b may be manufactured and attached to the blade 18 in the same way as previously described, and it should be appreciated that all of the technical features and advantages discussed above in relation to the previous embodiments apply equally to a curved tip extension such as the tip extension 20b shown in FIG. 17.

The above embodiments are provided by way of example only and are not intended to limit the scope of the invention. Many modifications may be made to these examples without departing from the scope of the present invention as defined in the accompanying claims. For example, whilst the dam 57, 57a provided at the trailing edge of the tip extension 20, 20a, 20b is made from foam in the above examples, other suitable materials may be used. Suitable materials may include compressible materials or materials that are softer than the materials comprising the blade trailing edge 68, thus allowing the trailing edge 68 to compress or cleave the material of the dam 57, 57a during fitting of the tip extension 20, 20a, 20b. In yet further embodiments, the adhesive dam 57, 57a in the tip extension 20, 20a, 20b may be provided with a longitudinal channel or slot for receiving the trailing edge 68 of the blade 18, which may allow harder or less compressible materials to be used and/or which may facilitate the process of fitting the tip extension 20, 20a, 20b to the blade 18.

The invention claimed is:

1. A method of attaching a tip extension to a wind turbine blade, the method comprising:
   providing the wind turbine blade having an outer surface and a tip end;
   providing the tip extension having an outer shell defining a substantially hollow interior for receiving the tip end of the blade;
   fitting the tip extension over the tip end of the blade such that an inboard portion of the tip extension overlaps the tip end of the blade and an overlap region is defined between the outer surface of the blade and an inner surface of the inboard portion of the tip extension; and
   supplying adhesive to the overlap region via one or more holes provided in the outer shell of the tip extension to bond the tip extension to the blade,
   wherein the outer shell of the tip extension is translucent and the method comprises visually monitoring the flow of adhesive in the overlap region through the translucent shell.

2. The method of claim 1, comprising providing one or more adhesive dams in the overlap region, the one or more adhesive dams being arranged to at least partially define one or more bond cavities in the overlap region, and supplying the adhesive to the one or more bond cavities via the one or more holes in the outer shell of the tip extension.

3. The method of claim 2, further comprising attaching the one or more adhesive dams to the tip end of the blade before fitting the tip extension to the blade.

4. The method of claim 3, wherein the one or more adhesive dams become sandwiched between the outer surface of the blade and the inner surface of the tip extension when the tip extension is fitted to the blade.

5. The method of claim 2, wherein the one or more adhesive dams are permeable to air.

6. The method of claim 1, wherein a plurality of holes are defined in the outer shell of the tip extension, and the method comprises supplying the adhesive through each hole sequentially.

7. The method of claim 6, wherein the plurality of holes are mutually spaced in a row that extends in a spanwise direction of the tip extension, and the method comprises sequentially supplying adhesive through each hole in the row moving in a direction towards an open end of the tip extension.

8. The method of claim 7, wherein air in the overlap region escapes via the open end of the tip extension when the adhesive is supplied to the overlap region.

9. The method of claim 7, wherein the open end of the tip extension is an inboard end.

10. The method of claim 1, wherein the method comprises terminating the supply of adhesive through a first hole when the flow of adhesive is seen through the translucent outer shell of the tip extension to approach an adjacent hole.

11. The method of claim 1, further comprising removing a tip of the wind turbine blade prior to fitting the tip extension.

12. The method of claim 1, further comprising providing one or more spacers in the overlap region to ensure a minimum clearance between the blade and the tip extension for the adhesive.

13. The method of claim 12, wherein the one or more spacers are pre-attached to the inner surface of the tip extension.

14. The method of claim 1, further comprising removing paint and/or gel coat from the outer surface of the blade prior to fitting the tip extension.

15. A wind turbine blade assembly comprising a wind turbine blade and a tip extension attached to a tip end of the blade according to the method of claim 1.

16. A wind turbine blade assembly, comprising:
   a wind turbine blade having a trailing edge and a tip end;
   a tip extension fitted to the tip end of the blade;
   an overlap region defined between an inboard portion of the tip extension and the tip end of the blade; and
   one or more adhesive dams in the overlap region at least partially defining one or more bond cavities;
   wherein the tip extension is bonded to the blade by adhesive in the bond cavities, and
   wherein the trailing edge of the blade projects into the one or more adhesive dams.

17. A method of attaching a tip extension to a wind turbine blade, the method comprising:
   providing the wind turbine blade having an outer surface and a tip end;
   providing the tip extension having an outer shell defining a substantially hollow interior for receiving the tip end of the blade, the tip extension further including an adhesive dam in a trailing edge region of the interior of the tip extension;
   fitting the tip extension over the tip end of the blade such that an inboard portion of the tip extension overlaps the tip end of the blade and an overlap region is defined between the outer surface of the blade and an inner surface of the inboard portion of the tip extension;
   sliding the tip extension onto the tip end of the wind turbine blade such that a trailing edge of the blade projects into the adhesive dam; and
   supplying adhesive to the overlap region via one or more holes provided in the outer shell of the tip extension to bond the tip extension to the blade.

* * * * *